United States Patent
Brandolese et al.

(10) Patent No.: US 9,125,439 B2
(45) Date of Patent: Sep. 8, 2015

(54) APPARATUSES, SYSTEM AND PROCESS FOR PROTECTIVE GARMENTS

(75) Inventors: Carlo Brandolese, Milan (IT); Giuseppe Di Martino, Palermo (IT); Luca Gabriele Giuliani, Pozzo d'Adda (IT); Cristian Previtali, Bonate Sopra (IT); Matteo Antonio Rigamonti, Besana Brianza (IT)

(73) Assignee: DAINESE S.P.A., Molvena (IT)

( * ) Notice: Subject to any disclaimer, the term of this patent is extended or adjusted under 35 U.S.C. 154(b) by 0 days.

(21) Appl. No.: 13/882,143

(22) PCT Filed: Oct. 28, 2011

(86) PCT No.: PCT/IB2011/054804
§ 371 (c)(1),
(2), (4) Date: Nov. 21, 2013

(87) PCT Pub. No.: WO2012/056424
PCT Pub. Date: May 3, 2012

(65) Prior Publication Data
US 2014/0073263 A1      Mar. 13, 2014

(30) Foreign Application Priority Data
Oct. 29, 2010   (IT) .............................. MI2010A2028

(51) Int. Cl.
*H04B 1/38*      (2015.01)
*A41D 1/00*      (2006.01)
*B60R 21/0132*   (2006.01)

(52) U.S. Cl.
CPC .............. *A41D 1/00* (2013.01); *B60R 21/0132* (2013.01); *H04B 1/38* (2013.01)

(58) Field of Classification Search
CPC ......... A41D 1/00; H04B 1/38; B60R 21/0132
USPC ............ 455/73, 41.1, 558, 569.2, 575.9, 415, 455/41.2; 376/317, 402; 363/17; 711/113, 711/122
See application file for complete search history.

(56) References Cited

U.S. PATENT DOCUMENTS 4,977,623 A * 12/1990 DeMarco .......................... 2/456
5,313,670 A *  5/1994 Archer, III ....................... 2/411
(Continued)

FOREIGN PATENT DOCUMENTS

EP     1005800     6/2000
EP     1630043     3/2006
(Continued)

OTHER PUBLICATIONS

PCT Written Opinion mailed on Feb. 14, 2012 for PCT/IB2011/054802 filed on Oct. 28, 2011 in the name of Dainese S.P.A. et al.
(Continued)

*Primary Examiner* — Marceau Milford
(74) *Attorney, Agent, or Firm* — Steinfl & Bruno LLP (57) ABSTRACT

An apparatus for personal protection is described. The apparatus has a secondary control unit which is connected to at least one firing controller and to at least one first secondary transceiver for transmitting and receiving on a first radio channel control signals and/or activation signals, wherein the secondary control unit is connected to a smart-card reader for reading an identification code stored in a smart-card and transmitting this identification code from the secondary transceiver in a control signal. A protective garment and a system which includes the apparatus, a main apparatus and vehicles which can communicate with the apparatus, as well as a process which can be carried out by this system are also described.

20 Claims, 8 Drawing Sheets

(56) References Cited

U.S. PATENT DOCUMENTS

| | | | |
|---|---|---|---|
| 5,500,952 A * | 3/1996 | Keyes | 2/465 |
| 5,568,939 A | 10/1996 | Blackburn et al. | |
| 5,668,723 A | 9/1997 | Blackburn | |
| 5,749,059 A | 5/1998 | Walton | |
| 5,781,936 A * | 7/1998 | Alaloof | 2/456 |
| 6,018,980 A | 2/2000 | Kimura et al. | |
| 6,175,299 B1 * | 1/2001 | Manlove et al. | 340/436 |
| 6,272,412 B1 * | 8/2001 | Wu et al. | 701/47 |
| 6,430,489 B1 * | 8/2002 | Dalum | 701/45 |
| 6,480,144 B1 | 11/2002 | Miller et al. | |
| 6,502,026 B2 * | 12/2002 | Kanameda | 701/45 |
| 6,584,403 B2 * | 6/2003 | Bunn | 701/454 |
| 6,783,153 B2 * | 8/2004 | Mattes | 280/735 |
| 6,917,305 B2 | 7/2005 | King | |
| 6,951,033 B2 | 10/2005 | Dainese | |
| 7,213,766 B2 * | 5/2007 | Ryan et al. | 235/492 |
| 7,433,974 B2 * | 10/2008 | Beckert et al. | 710/20 |
| 7,477,974 B2 * | 1/2009 | Haering et al. | 701/45 |
| 7,548,168 B2 * | 6/2009 | Ishikawa et al. | 340/573.1 |
| 7,740,272 B2 * | 6/2010 | Goto et al. | 280/735 |
| 7,921,472 B2 * | 4/2011 | Mazzarolo | 2/108 |
| 7,934,744 B2 * | 5/2011 | Suzuki et al. | 280/728.2 |
| 8,059,000 B2 * | 11/2011 | Ishikawa et al. | 340/573.1 |
| 8,102,258 B2 * | 1/2012 | Hyde et al. | 340/540 |
| 8,145,199 B2 * | 3/2012 | Tadayon et al. | 455/418 |
| 8,179,254 B2 * | 5/2012 | Hyde et al. | 340/540 |
| 8,270,638 B2 * | 9/2012 | Abolfathi et al. | 381/151 |
| 8,280,791 B2 * | 10/2012 | Davis et al. | 705/34 |
| 8,315,617 B2 * | 11/2012 | Tadayon et al. | 455/418 |
| 8,340,577 B2 * | 12/2012 | Griffin et al. | 455/41.2 |
| 8,365,316 B2 * | 2/2013 | Jan et al. | 2/455 |
| 8,402,568 B2 * | 3/2013 | Alstin et al. | 2/413 |
| 8,424,902 B2 * | 4/2013 | Hanafusa | 280/728.2 |
| 8,463,186 B2 * | 6/2013 | Griffin et al. | 455/41.2 |
| 8,495,382 B2 * | 7/2013 | Johnson et al. | 713/186 |
| 8,505,670 B2 * | 8/2013 | Ogawa et al. | 180/274 |
| 8,558,690 B2 * | 10/2013 | Kleve et al. | 340/539.11 |
| 8,590,924 B2 * | 11/2013 | Yamada et al. | 280/729 |
| 8,595,864 B2 * | 12/2013 | Orita et al. | 2/102 |
| 2002/0113417 A1 | 8/2002 | Mattes | |
| 2003/0182040 A1 * | 9/2003 | Davidson | 701/45 |
| 2008/0030010 A1 * | 2/2008 | Millet Lopez | 280/730.1 |
| 2009/0127835 A1 * | 5/2009 | Lin | 280/730.1 |

FOREIGN PATENT DOCUMENTS

| | | |
|---|---|---|
| JP | 1199905 | 4/1999 |
| JP | 2007071784 | 3/2007 |
| JP | 2007089061 | 4/2007 |
| JP | 2010228581 | 10/2010 |
| JP | 2011207359 | 10/2011 |
| WO | 0051453 | 9/2000 |
| WO | 2010/037931 | 4/2010 |

OTHER PUBLICATIONS

PCT International Search Report mailed on Feb. 14, 2012 for PCT/IB2011/054802 filed on Oct. 28, 2011 in the name of Dainese S.P.A. et al.

PCT International Preliminary Report on Patentability mailed on Feb. 4, 2013 for PCT/IB2011/054802 filed on Oct. 28, 2011 in the name of Dainese S.P.A.

PCT Written Opinion mailed on Apr. 5, 2012 for PCT/IB2011/054803 filed on Oct. 28, 2011 in the name of Dainese S.P.A. et al.

PCT International Search Report mailed on Apr. 5, 2012 for PCT/IB2011/054803 filed on Oct. 28, 2011 in the name of Dainese S.P.A. et al.

PCT International Preliminary Report on Patentability mailed on Mar. 15, 2013 for PCT/IB2011/054803 filed on Oct. 28, 2011 in the name of Dainese S.P.A.

PCT International Search Report mailed on Apr. 5, 2012 for PCT/IB2011/054804 filed on Oct. 28, 2011 in the name of Dainese S.P.A. et al.

Non-Final Office Action mailed on Jun. 5, 2014 for U.S. Appl. No. 13/882,150, filed Dec. 5, 2013 in the name of Carlo Brandolese et al.

Non-Final Office Action mailed on Mar. 16, 2015 for U.S. Appl. No. 13/882,150, filed Dec. 5, 2013 in the name of Carlo Brandolese.

Japanese Office Action mailed on Apr. 2, 2015 for Japanese Application 2013-535574 filed on Jun. 20, 2011 in the name of Federal-Mogul Bursc Heid GmbH.

PCT Written Opinion mailed on Apr. 5, 2012 for PCT/IB2011/054804 filed on Oct. 28, 2011 in the name of Dainese S.P.A. et al.

PCT International Preliminary Report on Patentability mailed on Mar. 15, 2013 for PCT/IB2011/054804 filed on Oct. 28, 2011 in the name of Dainese S.P.A. et al.

* cited by examiner

# APPARATUSES, SYSTEM AND PROCESS FOR PROTECTIVE GARMENTS

CROSS REFERENCE TO RELATED APPLICATIONS

The present application is the US national stage of International Patent Application PCT/IB2011/054804 filed on Oct. 28, 2011 which, in turn, claims priority to Italian Patent Application MI2010A002028 filed on Oct. 29, 2010.

The present invention relates to a system for the personal protection, and in particular a system provided with a main apparatus which can signal an accident to a secondary apparatus connected to a protective garment, for example provided with an airbag, for the activation of the latter. The present invention also relates to vehicles comprising such a main apparatus and a process which can be carried out by such a system.

WO 2010/037931 discloses a system for the personal protection wherein a main apparatus mounted on a motorcycle comprises a main control unit connected to two pairs of main 3-axis acceleration sensors and to a main transceiver for transmitting activation signals on a single radio channel with a frequency of about 900 MHz to a secondary transceiver of a secondary apparatus arranged on a protective garment provided with an airbag. Such known system also comprises a testing device which in case of malfunctions in the main apparatus switches the control unit of the main apparatus from a normal mode to a system fault mode, wherein the protective garment does not work. The secondary transceiver of the secondary apparatus may signal the power-on of the secondary apparatus to the main transceiver of the main apparatus, so that the latter can determine whether the secondary apparatus is off or on. When the main control unit determines an impact of the motorcycle by means of the main sensors, the main apparatus sends through the main transceiver an airbag activation signal to the secondary apparatuses.

Such known system has reliability problems in case of malfunctions of a transceiver, of interferences between the main apparatus and the secondary apparatuses or of impacts along particular directions, with consequent risks of an undesired activation of the protective garments or of a non-activation thereof in case of accident.

It is therefore an object of the present invention to provide a system free from said disadvantages. Said object is achieved with an apparatus, a system, a process and other products, whose technical features are disclosed in the attached claims.

Thanks to the particular bidirectional connection on two different channels for sending control signals between two transceivers in the main apparatus and two transceivers in the secondary apparatus, the system can also work in case of interferences on one channel and/or of malfunctions of a transceiver, especially if the frequency of the first channel is on a bandwidth, preferably comprised between 2400 and 2483.5 MHz, completely different from the bandwidth of the second channel.

For improving the reliability of the system, one or both the control units of the apparatuses comprise dual-core microprocessors, wherein each core controls a transceiver, so that the system can work properly, thanks to a particular process and/or to particular supervision devices connected to the control units, also in a degraded mode in which the protective garments can be activated though the radio connection on one channel does not work properly.

Particular auxiliary sensors allow, thanks to a particular accident detection process, to activate the protective garments not only in case of impact, with a higher reliability with respect to the known systems and processes for detecting impacts in personal protection systems, but also in case of slide of the vehicle, which is advantageous especially for the motorcycles.

For further improving the reliability of the system, smart-cards containing particular identification codes can be inserted into smart-card readers connected to the control units of the secondary apparatuses, so that these identification codes can be transmitted to the main apparatuses and recognized by the control units of the latter, so that the users can verify the correct connection between the main apparatus and one or more secondary apparatuses without the risk of interferences with other secondary apparatuses. The identification codes preferably comprise sub-codes which allow to recognize the position of the users in the vehicle, for example whether a user is the driver or a passenger, so as to easily distinguish the secondary apparatus having working problems form the secondary apparatus which works properly. With this arrangement, a smart-card associated to a main apparatus can be inserted into several secondary apparatuses, so that the user can easily change the protective garment with other protective garments while keeping the same vehicle on which the main apparatus is installed.

The secondary apparatuses are preferably provided with vibrating devices, so as to signal status changes to the user without the user being forced to watch a display, so as not to distract him if he drives a vehicle.

Further advantages and features of the apparatuses, the system and the process according to the present invention will become clear to those skilled in the art from the following detailed and non-limiting description of an embodiment thereof with reference to the attached drawings, wherein.

Figure 1:
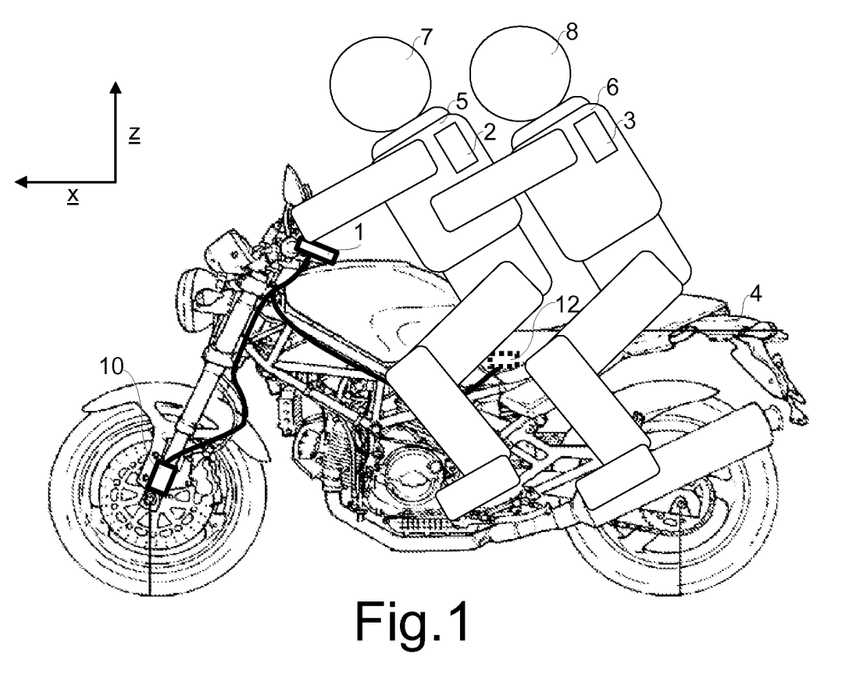
FIG. 1 shows a side view of a vehicle and two users provided with the system.
Figure 2:
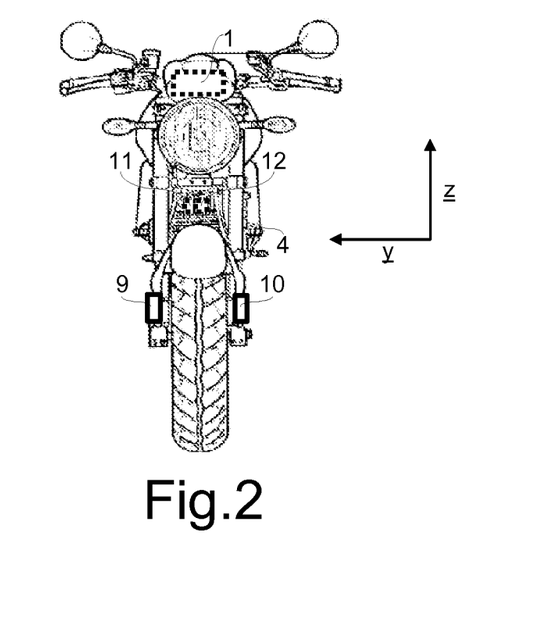
FIG. 2 shows a front view of the vehicle of FIG. 1.

Referring to FIGS. 1 and 2, it is seen that the system comprises a main apparatus 1 suitable for transmitting activation signals and/or control signals to one or more secondary apparatuses 2, 3. The main apparatus 1 can be installed on a vehicle 4, for example a motorcycle, while each secondary apparatus 2, 3 is arranged on a protective garment 5, 6 of a user 7, 8, for example the driver and the passenger of vehicle 4. The protective garments 5, 6 are jackets which can be worn by users 7, 8 and are provided with one or more airbags suitable for being inflated by gas generators controlled by a secondary apparatus 2, 3 in case of accident. The main apparatus 1 is connected to one or more main sensors 9, 10, in particular acceleration sensors on three axes x, y, z mounted on a portion of vehicle 4 which can move with respect to the seats for the users 7, 8, for example a pair of acceleration sensors mounted on the fork of the motorcycle on the two sides of the front wheel.

The main apparatus 1 is further connected to one or more auxiliary sensors 11, 12, in particular a pair of acceleration sensors on at least one axis y, which are mounted on a portion of vehicle 4 which is fixed with respect to the seats for users 7, 8, for example under the saddle of the motorcycle. The auxiliary sensors 11, 12 are arranged one beside the other in vehicle 4. The main sensors 9, 10 and/or the auxiliary sensors 11, 12 can be connected to the main apparatus by means of cables or with wireless means.

Axis x is a substantially longitudinal axis, namely substantially parallel to the main displacement direction of vehicle 4, axis y is a substantially transversal and horizontal axis, namely substantially perpendicular to axis x, while axis z is substantially transversal and vertical, namely substantially perpendicular to axis x and axis y. The system is mounted on a motorcycle 4 but it may be mounted also on other land, sea and air vehicles, for example bicycles, motor vehicles, horses, skis, sledges, boats, airplanes, helicopters, parachutes, etc.

Figure 3:
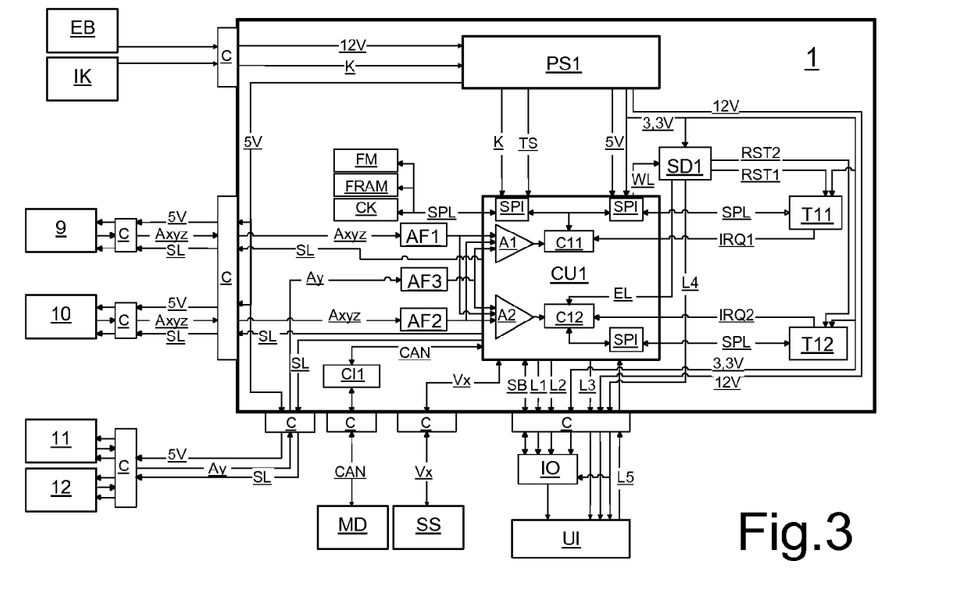
FIG. 3 shows a block scheme of the main apparatus of the system.

Referring to FIG. 3, it is seen that the main apparatus 1 comprises a main control unit CU1, in particular comprising a dual core microcontroller, for example microcontroller Freescale MC9S12XE-LQFP144, which is connected to one or more anti-aliasing filters AF1, AF2, AF3 in turn connected to connectors C for connecting the main control unit CU1 to the main sensors 9, 10 and to the auxiliary sensors 11, 12. A first core C11, for example a HCS12 core, of the main control unit CU1 is connected in a bidirectional manner through an interface SPI and serial and/or parallel lines SPL to a clock CK and to one or more non-volatile digital memories, for example a flash memory FM and a FRAM memory.

The first core C11 of the main control unit CU1 is further connected in a bidirectional manner through an interface SPI and serial and/or parallel lines SPL to a first main transceiver T11 suitable for transmitting and receiving control signals and/or activation signals on a first radio channel with a first frequency comprised between 2400 and 2483.5 MHz. The anti-aliasing filters AF1, AF2, AF3 are connected to the first core C11 through a first analog-to-digital converter A1, so that the acceleration signals Axyz transmitted by the main sensors 9, 10 and the acceleration signals Ay transmitted by the auxiliary sensors 11, 12 can be processed by the first core C11. A second core C12, for example an Xgate core, of the main control unit CU1 is connected in a bidirectional manner through an interface SPI and serial and/or parallel lines SPL to a second main transceiver T12 suitable for transmitting and receiving control signals and/or activation signals on a second radio channel with a second frequency different from the first frequency, in particular comprised between 868 and 868.6 MHz or between 902 and 928 MHz. The anti-aliasing filters AF1, AF2, AF3 are connected to the second core C12 through a second analog-to-digital converter A2, so that the acceleration signals Axyz transmitted by the main sensors 9, 10 and the acceleration signals Ay transmitted by the auxiliary sensors 11, 12 can be simultaneously processed also by the second core C12. One or both main transceivers T11 and/or T12 are connected to the first core C11 or to the second core C12, respectively, by means of interrupt lines IRQ1, IRQ2 for transmitting interrupt signals to cores C11, C12 of the main control unit CU1 according to control signals received by the main transceivers T11 and/or T12. The anti-aliasing filters AF1, AF2, AF3 are preferably Sallen-Key low-pass filters with a cutoff frequency equal to a 143 Hz±10% and a Q factor equal to 0.74±10%. The analog-to-digital converters A1, A2 sample the acceleration signals Axyz and Ay at a sampling frequency comprised between 1400 and 1600 Hz.

The main control unit CU1 can be connected also to a speed sensor SS, for example the same device used for determining the speed in vehicle 4, so that the main control unit CU1 can obtain a longitudinal speed signal Vx corresponding to the speed of vehicle 4. The main control unit CU1 can be connected through a CAN bus also to a CAN (Controller Area Network) interface CI1 for the connection to another CAN interface (not shown) present in vehicle 4 and/or to CAN maintenance devices MD for the maintenance of the main apparatus 1.

The main control unit CU1 can be connected through a watchdog line WL also to a supervision device SD1, in particular a reset circuit with an adjustable timeout delay such as for example the MAX6753 integrated circuit of Maxim Semiconductor, which can transmit reset signals to the main transceivers T11 and/or T12 through reset lines RST1, RST2, as well as an enabling signal of the second core C12 through an enabling line EL according to control signals received by the main control unit CU1 through the watchdog line WL and processed by the supervision device SD1. The main control unit CU1 can transmit self-test signals to the main sensors 9, 10 and/to the auxiliary sensors 11, 12 through self-test lines SL. The main control unit CU1 can be connected through a serial bus SB to an input/output controller IO in turn connected to a user interface UI, for example a LCD or LED display and/or a keyboard, so that user 7 can receive and/or transmit information from the main apparatus 1 and/or to the main apparatus 1. The main control unit CU1 and/or the supervision device SD1 can transmit status signals to the input/output controller IO or directly to the user interface UI through lines L1, L2, L3 and L4. Also the user interface UI can transmit status signals to the main control unit CU through a line L5.

A power supply PS1 receives electric current from an external battery EB, for example the same 12V battery of vehicle 4, for supplying a continuous electric current to the components of the main apparatus 1 by means of 3.3V, 5V and 12V lines. The power supply PS1 can also receive an ignition signal K from the ignition key 1K of vehicle 4. The power supply PS1 transmits to the main control unit CU1 the ignition signal K and a signal TS corresponding to the temperature of the power supply PS1. A plurality of connectors C connects the main apparatus 1 with the external components. Further control lines connect the power supply PS1 to the main control unit CU1 for the control of the voltages on the lines inside and/or outside the main apparatus 1.

Figure 4:
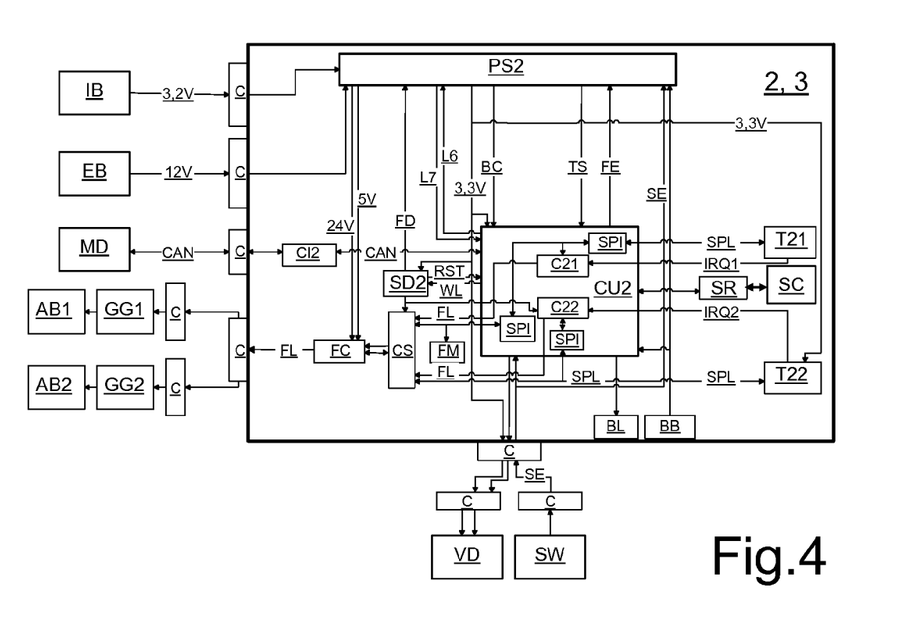
FIG. 4 shows a block scheme of the secondary apparatus of the system.

Referring to FIG. 4, it is seen that the secondary apparatus 2, 3 comprises a secondary control unit CU2, in particular comprising a dual core microcontroller, for example microcontroller Freescale MC9S12XE-LQFP112. A first core C21, for example a HCS12 core, of the secondary control unit CU2 is connected in a bidirectional manner through an interface SPI and serial and/or parallel lines SPL to a non-volatile digital memory, for example a flash memory FM. The first core C21 of the secondary control unit CU2 is further connected in a bidirectional manner through an interface SPI and serial and/or parallel lines SPL to a first secondary transceiver T21 suitable for transmitting and receiving control signals and/or activation signals from the first main transceiver T11 of the main apparatus 1 on the first radio channel with a first frequency comprised between 2400 and 2483.5 MHz. A second core C22, for example an Xgate core, of the secondary control unit CU2 is connected in a bidirectional manner through an interface SPI and serial and/or parallel lines SPL to a second secondary transceiver T22 suitable for transmitting and receiving control signals and/or activation signals from the second main transceiver T12 of the main apparatus 1 on the second radio channel with a second frequency different from the first frequency, in particular comprised between 868 and 868.6 MHz or between 902 and 928 MHz. One or both secondary transceivers T21 and/or T22 are connected to the first core C21 or to the second core C22, respectively, by means of interrupt lines IRQ1, IRQ2 for transmitting interrupt signals to cores C21, C22 of the secondary control unit CU2 according to control signals received by the secondary transceivers T21 and/or T22.

The first core C21 and the second core C22 of the secondary control unit CU2 are connected through a channel switch CS to at least one firing controller FC, in turn connected through connectors C to one or more gas generators GG1, GG2 for driving one or more airbags AB1, AB2 of the protective garment 5, 6 by means of activation signals transmitted through firing lines FL from the first core C21 and/or from the second core C22 according to activation signals received by the secondary transceivers T21 and/or T22. The first core C21 and the second core C22 are connected in a bidirectional manner through an interface SPI and serial and/or parallel lines SPL to the channel switch CS for controlling the switching of the firing lines coming from the first core C21 and from the second core C22.

The secondary control unit CU2 of the secondary apparatus 2, 3 is connected to a smart-card reader SR for reading an identification code stored in a smart-card SC ad associated to a reference code stored in a non-volatile memory, in particular in the flash memory FM, of the main apparatus 1. The identification code in the smart-card SC comprises in turn a first sub-code associated to the reference code stored in the main apparatus 1 and a second sub-code which indicates the position of user 7, 8 on vehicle 4, for example the position of driver 7 or passenger 8.

The secondary control unit CU2 of the secondary apparatus 2, 3 can be connected through a CAN bus also to a CAN (Controller Area Network) interface CI2 for the connection to CAN maintenance devices MD for the maintenance of the secondary apparatus 2, 3.

The secondary control unit CU2 can be connected through a watchdog line WL also to a supervision device SD2, in particular a reset circuit with an adjustable timeout delay such as for example the MAX6753 integrated circuit of Maxim Semiconductor, which can transmit reset signals to the secondary control unit CU2 through a reset line RST. The supervision device SD2 of the secondary apparatus 2, 3 is also connected to the channel switch CS for transmitting a switching signal to the channel switch CS, so as to switch the connection from the firing line FL from the first core C21 to the firing line FL from the second core C22 or even interrupting lines FL for preventing the driving of the protective garment 5, 6 in case of malfunction. The supervision device SD2 is also connected to the second core C22 for transmitting an enabling signal or a disabling signal, which can be sent through the second secondary transceiver T22 to the main apparatus 1.

The secondary control unit CU2 of the secondary apparatus 2, 3 can be connected to a vibrating device VD for signaling to user 7, 8 the status of the secondary apparatus 2, 3, for example malfunctions or anomalies, by means of vibrations of the protective garment 5, 6. The secondary control unit CU2 of the secondary apparatus 2, 3 can be connected by means of a line SE to a switch SW of the protective garment 5, 6 for the activation or the deactivation of the secondary control unit Cu2.

A power supply PS2 of the secondary apparatus 2, 3 is connected to an external battery EB, for example the same 12V battery of vehicle 4 and/or to an internal 3.2V battery IB, preferably rechargeable by the power supply PS2, which supplies a continuous electric current to the components of the secondary apparatus 2, 3 by means of 3.3V, 5V, 12V and 24V lines. The control of the recharge of the internal battery IB is carried out by the secondary control unit CU2 by means of lines L6, L7 connecting the power supply PS2 to the secondary control unit CU2. The power supply PS2 is connected to the firing controller FC by means of a line which carries a voltage sufficient for driving the gas generators GG1, GG2, in particular a 24V line. The voltage on the 24V line can be activated or deactivated by the secondary control unit CU2 and/or by the supervision device SD2 by means of voltage enabling and/or disabling signals which are transmitted to the power supply PS2 through lines FE, FD. The status of batteries EB and/or 1B connected to the power supply PS2 can be controlled by pushing a button BB connected to the power supply PS2 and/or to the secondary control unit CU2. When user 7, 8 pushes button BB, the power supply PS2 sends through a line BC a status signal to the secondary control unit CU2, which in turn turns on a battery light BL according to this status signal.

The power supply PS2 is connected to switch SW by means of line SE for turning on and off the secondary apparatus 2, 3. The power supply PS2 transmits to the secondary control unit CU2 a signal TS corresponding to the temperature of the power supply PS2. The secondary apparatus 2, 3 is connected with the external components through a plurality of connectors C. Further control lines connect the power supply PS2 to the secondary control unit CU2 for controlling the voltages on the lines inside and/or outside the secondary apparatus 2, 3.

Figure 5:
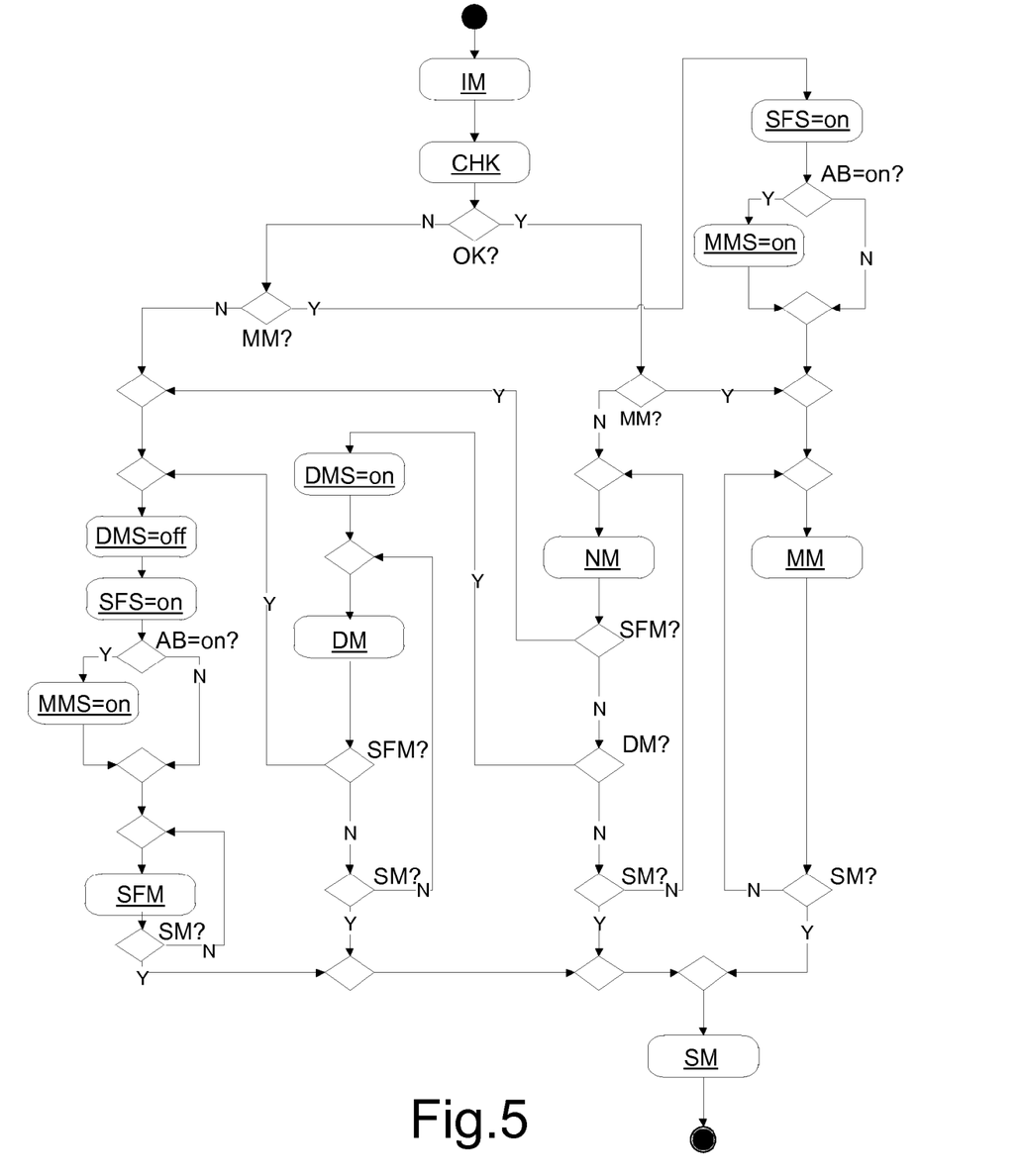
FIGS. 5 to 10 show flow-charts of the system working.

Referring to FIG. 5, it is seen that when the main apparatus 1 and/or the secondary apparatuses 2, 3 are turned on, the system is in an initial mode IM, after which the control units CU1, CU2 of the main apparatus 1 and of the secondary apparatuses 2, 3 carry out a check phase CHK for verifying that all the components of the main apparatus 1 and of the secondary apparatuses 2, 3 work properly. The control units CU1, CU2 of the main apparatus 1 and of the secondary apparatuses 2, 3 work in a normal mode NM, in which the main transceivers T11, T12 of the main apparatus 1 are connected with the secondary transceivers T21, T22 of one or more secondary apparatuses 2, 3, if they pass the check phase CHK and they are not in a maintenance mode MM, which is detected if one or more maintenance devices MD are connected to the control units CU1 and/or CU2.

If the control units CU1, CU2 of the main apparatus 1 and of the secondary apparatuses 2, 3 do not pass the check phase CHK and are in the maintenance mode MM, the main control unit CU1 shows on the user interface UI a system fault signal SFS and, if airbags AB1, AB2 of one or both secondary apparatuses 2, 3 have been activated, also a maintenance signal MMS. At the same time, the secondary control unit CU2 of the secondary apparatuses 2, 3 drives the vibrating device VD.

During the maintenance mode MM the control units CU1, CU2 of the main apparatus 1 and/or of the secondary apparatuses 2, 3 transmit and/or receive data from the maintenance devices MD, after which they switch to a stop mode SM, in which the main apparatus 1 and the secondary apparatuses 2, 3 are deactivated.

During the normal mode NM the control units CU1, CU2 of the main apparatus 1 and of the secondary apparatuses 2, 3 carry out a normal working cycle, in which the control unit CU1 of the main apparatus 1 may transmit an activation signal to the secondary apparatuses 2, 3 for activating airbags AB1, AB2 if an accident is detected, but also verify whether a system fault occurred, in which case they switch to a system fault mode SFM, or whether a system degradation occurred, in which case they switch to a degraded mode DM, or whether a system interruption occurred, in which case they switch to the stop mode SM.

During the degraded mode DM the control units CU1, CU2 of the main apparatus 1 and of the secondary apparatuses 2, 3 carry out a normal working cycle, in which the control unit CU1 of the main apparatus 1 may still transmit an activation signal to the secondary apparatuses 2, 3 for activating airbags AB1, AB2 if an accident is detected, but also verify whether a system fault occurred, in which case they switch to a system fault mode SFM, or whether a system interruption occurred, in which case they switch to the stop mode SM. In the degraded mode DM the main control unit CU1 shows on the user interface UI a degraded mode signal DMS. At the same time, the secondary control unit CU2 of the secondary apparatuses 2, 3 drives the vibrating device VD.

The control units CU1, CU2 of the main apparatus 1 and of the secondary apparatuses 2, 3 switch to the system fault mode SFM also if they do not pass the check phase CHK and if they are not in the maintenance mode MM. In the system fault mode SFM the main control unit CU1 turns off on the user interface UI the degraded mode signal DMS, if it was on, and turns on on the user interface UI the system fault signal SFS. At the same time, the secondary control unit CU2 of the secondary apparatuses 2, 3 drives the vibrating device VD. In the system fault mode SFM the main control unit CU1 shows on the user interface UI also a maintenance signal MMS, if airbags AB1, AB2 of one or both secondary apparatuses 2, 3 have been activated. During the system fault mode SFM the control units CU1, CU2 of the main apparatus 1 and of the secondary apparatuses 2, 3 verify whether a system interruption occurred, in which case they switch to the stop mode SM.

Figure 6:
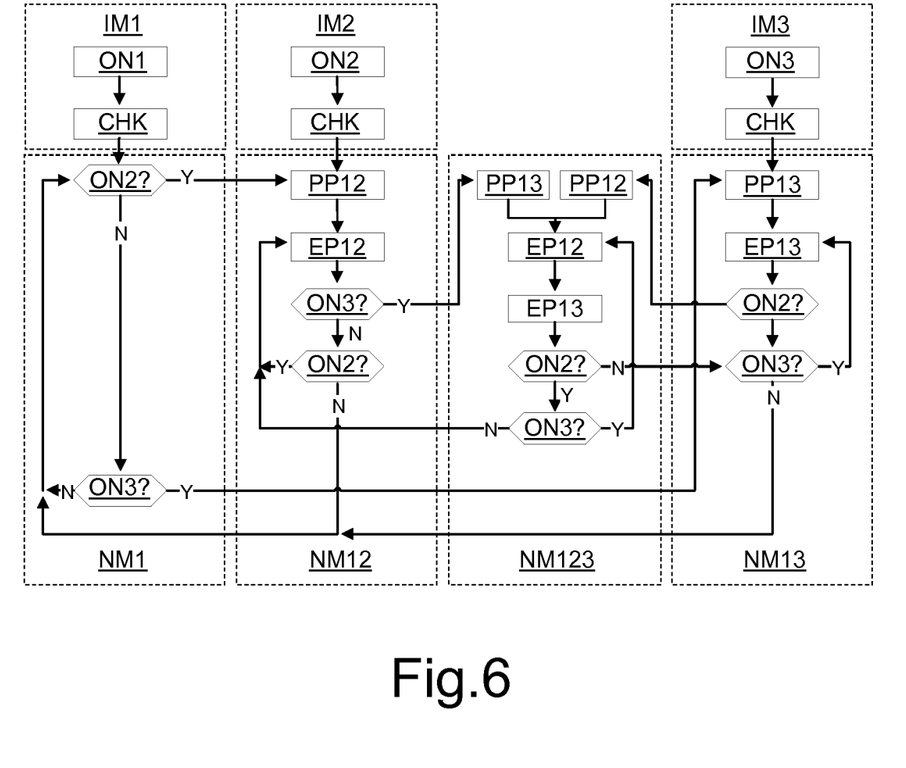

Referring to FIG. 6, it is seen that the main apparatus 1 and the secondary apparatuses 2, 3, in the respective initial mode IM1, IM2, IM3, carry out a power-on phase ON1, ON2, ON3 and the check phase CHK1, CHK2, CHK3 in the above described way. After the initial mode IM1, the main apparatus 1 in a first normal mode NM1 sends control signals on the first radio channel through the first main transceiver T11 and on the second radio channel through the second main transceiver T12 for verifying the power-on of the secondary apparatuses 2, 3. If these control signals are received by the first secondary transceiver T21 and by the second secondary transceiver T22 of the secondary apparatuses 2 and/or 3 which have carried out the initial mode IM2 and/or IM3, the main apparatus 1 and the secondary apparatuses 2 and/or 3 carry out a pairing phase PP12 and/or PP13, respectively, in which the secondary apparatuses 2 and/or 3 transmit to the main apparatus 1 the respective identification codes stored in the smart-cards SC inserted in the respective smart-card readers SR, so that the control unit CU1 of the main apparatus 1 can compare the identification codes received by the secondary apparatuses 2 and/or 3 with the reference code stored in the non-volatile memory FM. If this comparison is positive, the main apparatus 1 is paired with the secondary apparatuses 2 and/or 3, so that the control unit CU1 of the main apparatus 1 periodically transmits and receives control signals with the control unit CU2 of the secondary apparatuses 2 and/or 3 through transceivers T11, T12, T21 and T22. After the pairing phase PP12 and/or PP13 the secondary apparatuses 2 and/or 3 are connected with the main apparatus 1 in an enabled protection phase EP12 and/or EP13, in which the control unit CU2 of the secondary apparatuses 2 and/or 3 can activate airbags AB1, AB2 according to activation signals transmitted by the main apparatus 1. The enabled protection phase EP12 and/or EP13 is carried out in a second normal mode NM12 in which the main apparatus 1 and only the first secondary apparatus 2 are on, or in a third normal mode NM13 in which the main apparatus 1 and only the second secondary apparatus 3 are on, or in a fourth normal mode NM 123 in which the main apparatus 1 and both secondary apparatuses 2, 3 are on. In all the normal modes NM1, NM12, NM13 and NM123 the main apparatus 1 sends control signals from the first main transceiver T11 and/or from the second main transceiver T12 for verifying the power-on of the secondary apparatuses 2, 3. If the first secondary transceiver T21 and the second secondary transceiver T22 of the secondary apparatuses 2 and/or 3 do not reply to the control signals transmitted by the main apparatus 1, the latter disables the pairing with the secondary apparatus 2 and/or 3 which does not reply, switching then from the fourth normal mode NM123 to the second or third normal mode NM12 or NM13, or switching from the second or third normal mode NM12 or NM 13 to the first normal mode NM 1.

Figure 7:
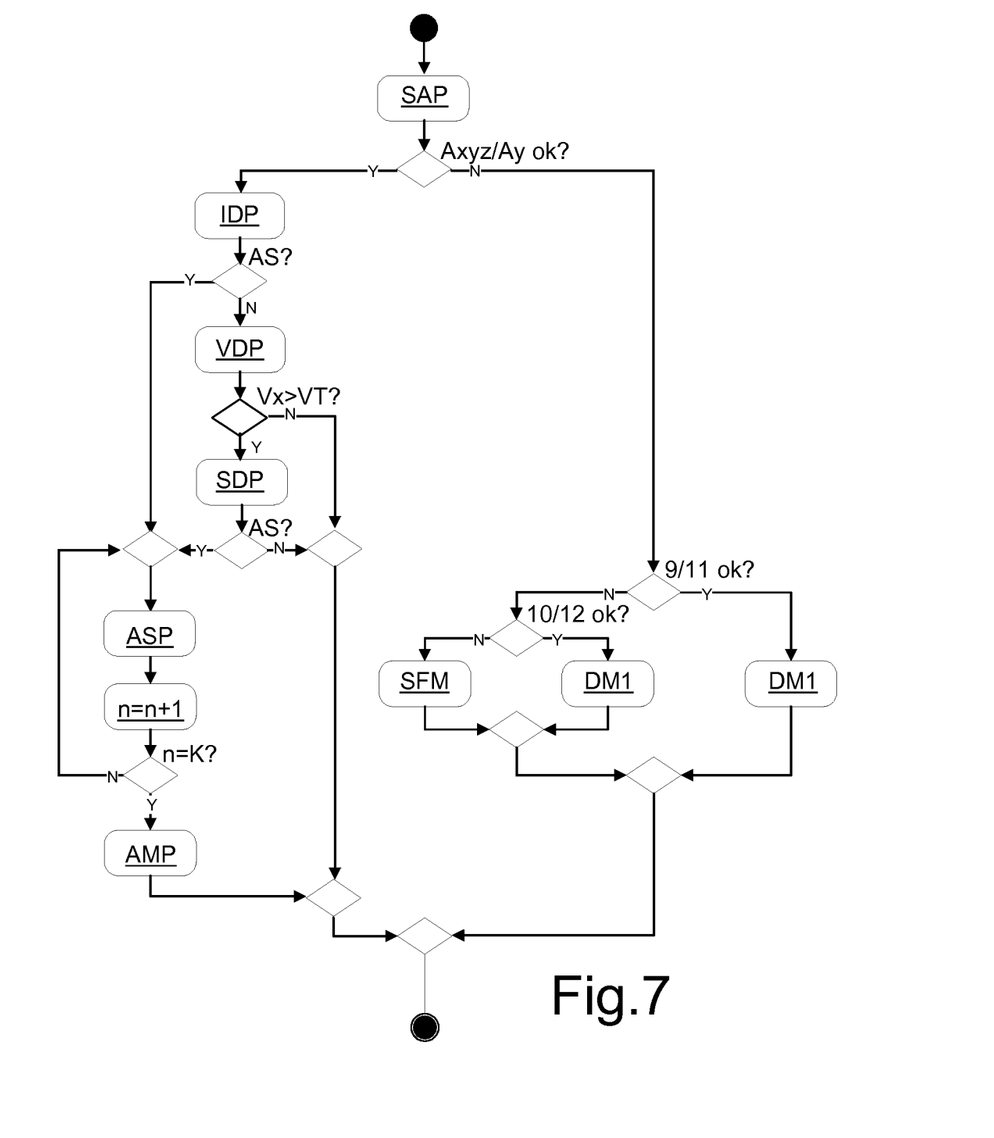

Referring to FIG. 7, it is seen that in the second, third or fourth normal mode NM12, NM13 or NM123, namely in a normal mode in which the main apparatus 1 is paired with at least one secondary apparatus 2, 3 in an enabled protection phase EP12 and/or EP13, the main control unit CU1 of the main apparatus 1 in a signal acquisition phase SAP acquires the acceleration signals Axyz and/or Ay from the main sensors 9, and/or from the auxiliary sensors 11, 12 through the anti-aliasing filters AF1, AF2, AF3. If at least one of the values of the signals Axyz and/or Ay is outside a range of correct values stored in a non-volatile memory FM and/or FRAM, the main control unit CU1 of the main apparatus 1 verifies the proper working of the of the main sensors 9, and/or of the auxiliary sensors 11, 12 by sending a self-test signal through the self-test lines SL. If both main sensors 9, 10 or both auxiliary sensors 11, 12 do not reply to the self-test signal, the main control unit CU1 switches the main apparatus 1 to the system fault mode SFM, otherwise if only one of the main sensors 9, 10 and/or of the auxiliary sensors 11, 12 replies to the self-test signal, the main control unit CU1 switches the main apparatus 1 to a first degraded mode DM1, in which the main sensor 9, 10 and/or the auxiliary sensor 11, 12 which does not reply to the self-test signal is excluded.

If instead the values of the acceleration signals Axyz and/or Ay are within a valid range, the main control unit CU1 of the main apparatus 1 in an impact detection phase IDP detects whether an impact occurred according to the acceleration signals Axyz sent by the main sensors 9, 10. If an impact is not detected in the impact detection phase IDP, the main control unit CU1 in a speed detection phase VDP detects whether vehicle 4 is moving with a longitudinal speed Vx higher than a speed threshold VT, for example comprised between 2 and 10 m/s, stored in a non volatile memory FM and/or FRAM. The main control unit CU1 of the main apparatus 1 can obtain the longitudinal speed Vx by means of the speed sensor SS, by means of other speed or acceleration sensors or in another way, in particular by verifying whether the transversal accelerations Ay and/or the vertical accelerations Az in the acceleration signals Axyz sent by the main sensors 9, 10 exceed acceleration thresholds stored in a non-volatile memory FM and/or FRAM. If the longitudinal speed Vx of vehicle 4 is higher than the speed threshold VT, the main control unit CU1 of the main apparatus 1 in a slide detection phase SDP detects whether a slide occurred according to the acceleration signals Ay sent by the auxiliary sensors 11, 12. If an impact is detected in the impact detection phase IDP or a slide is detected in the slide detection phase SDP, the main control unit CU1 of the main apparatus 1 in an accident signaling phase ASP sends an activation signal AS to the secondary apparatuses 2, 3 for a number k of times through the first main transceiver T11 and/or the second main transceiver T12, after which, in an accident memory phase AMP, stores in the non-volatile memory FRAM all the available data relating to the moment of the accident detection and/or to the acceleration signals Axyz and/or Ay sent by the main sensors 9, 10 and/or by the auxiliary sensors 11, 12 in the moments preceding the accident, for example during a period MT longer than 250 ms before the accident.

The acceleration signals Axyz and/or Ay are stored at each sampling cycle into a circular buffer in the non-volatile memory FRAM, so that the accident memory phase AMP consists of the stoppage of the writing in the non-volatile memory FRAM, which thus is accessible in a subsequent moment by means of a maintenance device MD for detecting the causes of the accident.

When the first secondary transceiver T21 and/or the second secondary transceiver T22 of the secondary apparatuses 2, 3 receive the activation signal AS from the main apparatus 1, the secondary control unit CU2 of the secondary apparatuses 2, 3 sends the activation signals through the firing lines FL to the gas generators GG1, GG2 for activating airbags AB1, AB2.

Figure 8:
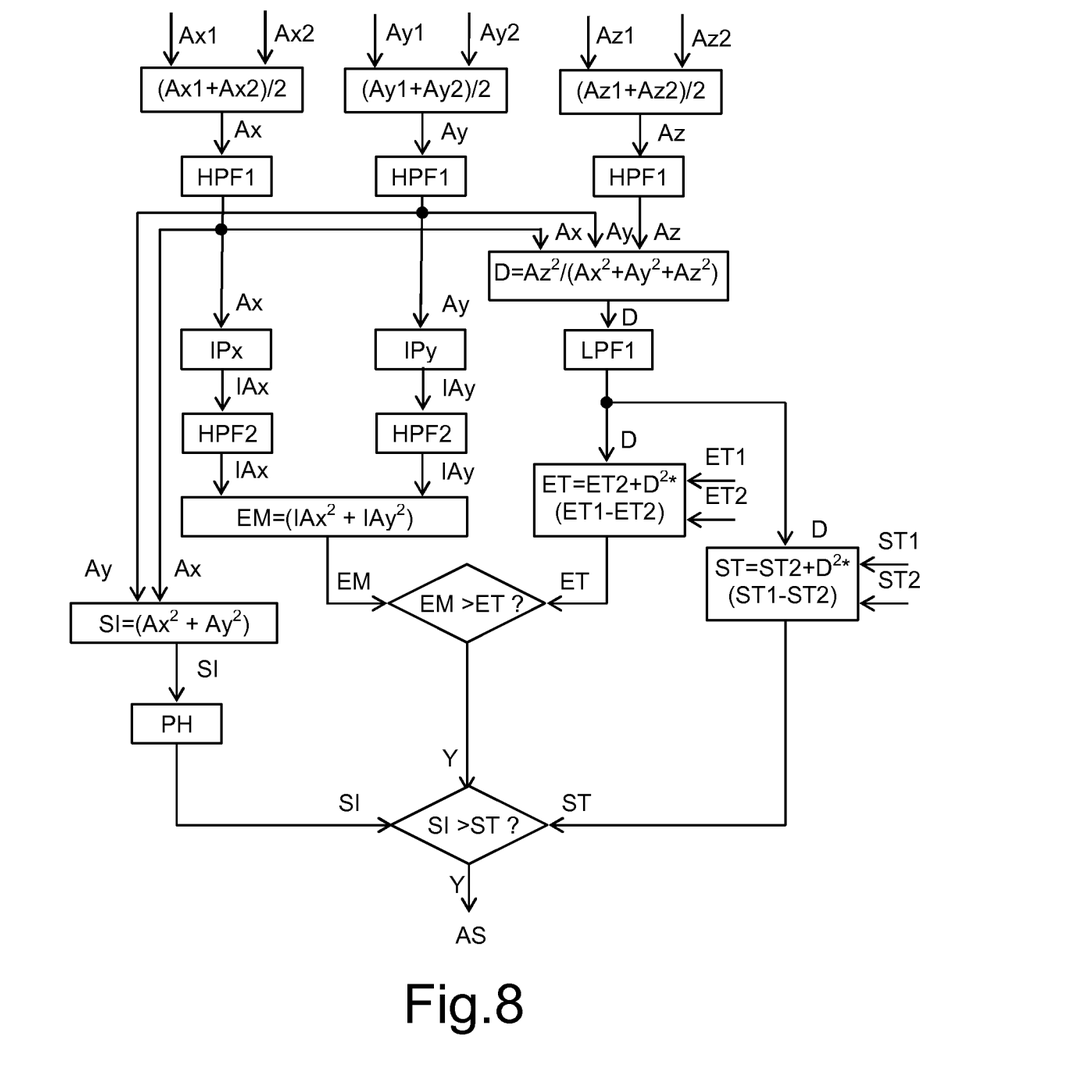

Referring to FIG. 8, it is seen that in the impact detection phase IDP the acceleration signals Axyz sent by the main sensors 9, 10 and filtered by the anti-aliasing filters AF1, AF2 are processed by the main control unit CU1 of the main apparatus 1 so as to obtain axial acceleration values Ax, Ay and Az on the three axes x, y and z, which are in particular obtained with a mean, for example an arithmetic mean, of the three pairs of axial accelerations Ax1 and Ax2, Ay1 and Ay2, Az1 and Az2, oriented along axes substantially parallel, of the two acceleration signals Axyz sent by the main sensors 9, 10. One or more axial acceleration values Ax, Ay and Az are filtered by the main control unit CU1 by means of first high-pass filter stages HPF1 having a cutoff frequency comprised between 0.5 and 15 Hz, in particular between 4 and 6 Hz, so as to cancel possible axial acceleration values which depend only on the movement of vehicle 4, after which the main control unit CU1 calculates a direction value D proportional to the square of the vertical acceleration Az and inversely proportional to the sum of the squares of the three axial accelerations Ax, Ay and Az, in particular with the formula $D=Az^2/(Ax^2+Ay^2+Az^2)$. The direction value D is filtered by the main control unit CU1 by a first low-pass filter stage LPF1 having a cutoff frequency comprised between 1 and 100 Hz, in particular between 20 and 40 Hz, so as to obtain a filtered direction value D which is not influenced by anomalous peaks in the acceleration signals Axyz. The main control unit CU1 calculates an energy threshold ET and a stress threshold ST by means of the filtered direction value D, in particular through a pair of energy constants ET1, ET2 and a pair of stress constants ST1, ST2, which are obtained in an experimental manner and are stored in a non-volatile memory FM and/or FRAM of the main apparatus 1. The energy threshold ET and the stress threshold ST are proportional to the square of the filtered direction value D, to a constant ET2 or ST2, and/or to the difference of the pairs of constants ET1 and ET2, ST1 and ST2, in particular by means of the formulae $ET=ET2+D^2*(ET1-ET2)$ and/or $ST=ST2+D^2*(ST1-ST2)$.

At least two axial acceleration values, in particular the horizontal acceleration values Ax, Ay, are also integrated by the main control unit CU1 by means of integration phases IPx, IPy for obtaining axial acceleration integral values IAx, IAy, which are then filtered in second high-pass filter stages HPF2 having a cutoff frequency comprised between 0.05 and 1 Hz, so as to cancel possible initialization errors. The main control unit CU1 calculates then an energy modulus EM according to the axial acceleration integral values IAx, IAy, in particular by calculating an energy modulus EM proportional to the sum of the squares of the axial acceleration integral values IAx, IAy, for example with the formula $EM=(IAx^2+IAy^2)$.

The main control unit CU1 calculates a stress intensity SI according to at least two axial acceleration values, in particular to the horizontal acceleration values Ax, Ay, by calculating a stress intensity SI proportional to the sum of the squares of the axial acceleration values Ax, Ay, for example with the formula $SI=Ax^2+Ay^2$, after which the value of the stress intensity SI is held by a peak holder phase PH which limits the slope with which this value returns to the value obtained by the acceleration values detected by the main sensors 9, 10 after a peak, so as to compensate the delay between the calculations of the stress intensity SI and of the energy modulus EM, which delay is caused by the integration operation in the integration phases IPx, IPy. A possible implementation of the peak holder phase PH in the main control unit CU1 can be the following:

if$(SI(t)<(SI(t-1)-DCY))$ then $(SI(t)=(SI(t-1)-DCY))$, wherein SI(t) is the stress intensity SI during the time and DCY is a decay constant greater than 100 $g^2$/ms, in particular comprised between 990 and 1010 $g^2$/ms, wherein g is the acceleration of gravity and ms are milliseconds.

If the main control unit CU1 verifies that at a given instant the stress intensity SI is greater than the stress threshold ST and simultaneously the energy modulus EM is greater than the energy threshold ET, the main control unit CU1 of the main apparatus 1 sends the activation signal AS to the control units CU2 of the secondary apparatuses 2, 3.

Figure 9:
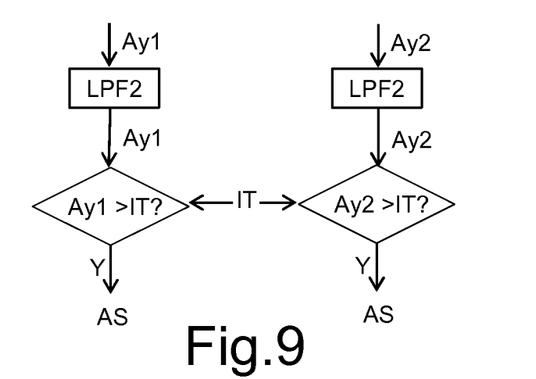

Referring to FIG. 9, it is seen that in the slide detection phase SDP the axial acceleration signals Ay1, Ay2 sent by the auxiliary sensors 11, 12 and filtered by the anti-aliasing filter AF3 are processed by the main control unit CU1 of the main apparatus 1 in second low-pass filter stages LPF2 having a cutoff frequency comprised between 100 and 200 Hz, in particular between 140 and 160 Hz, so as to eliminate possible anomalous peaks. If however after a given waiting time WT, for example comprised between 100 and 300 ms, signals Ay1 or Ay2 are always greater than an acceleration threshold AT, for example comprised between 0.5 and 1 g (acceleration of gravity), stored in a non-volatile memory FM and/or FRAM, then the main control unit CU1 of the main apparatus 1 sends the activation signal AS to the control units CU2 of the secondary apparatuses 2, 3.

Figure 10:
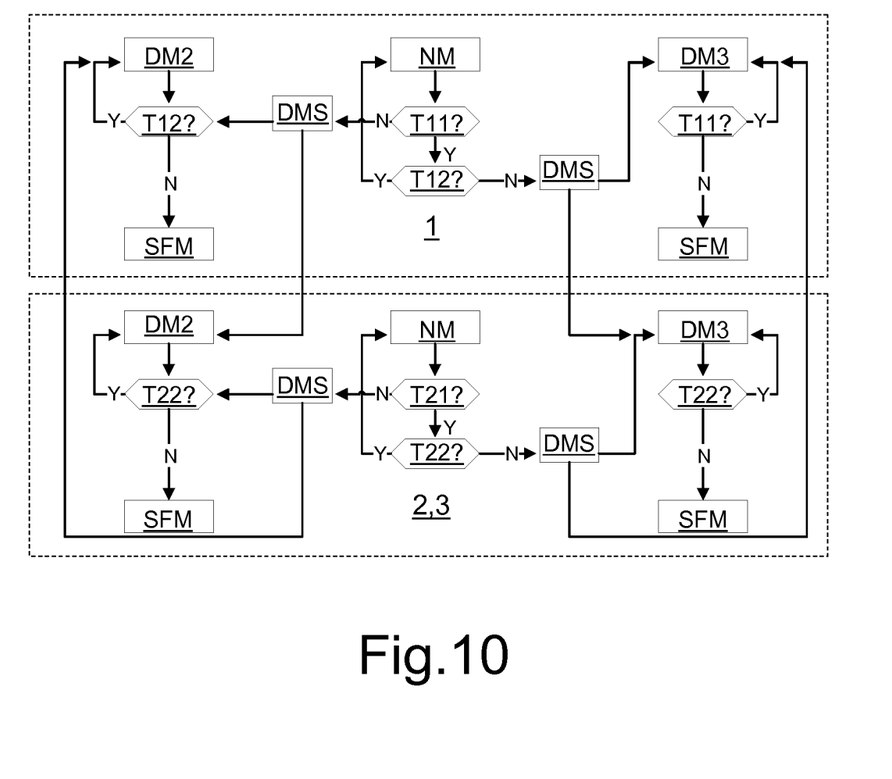

Referring to FIG. 10, it is seen that in the normal mode NM the control units CU1, CU2 of the main apparatus 1 and of the secondary apparatuses 2, 3 verify whether the main transceivers T11, T12 and the secondary transceivers T21, T22 communicate properly between each other.

In particular, the first core C11 of the main control unit CU1 of the main apparatus 1 receives and processes the acceleration signals Axyz, Ay and sends on the first radio channel through the first main transceiver T11 the control signals to the first secondary transceiver T21 of the secondary apparatuses 2, 3, in which the first core C21 of the secondary control unit CU2 receives the control signals on the first radio channel from the first secondary transceiver T21 and sends an activation signal to the gas generators GG1, GG2 if it receives from the main apparatus 1 also activation signals. In the meanwhile, the second core C12 of the main control unit CU1 of the main apparatus 1 and the second core C22 of the secondary control unit CU2 of the secondary apparatuses 2, 3 periodically send on the second radio channel control signals from the second main transceiver T12 and from the second secondary transceiver T22, respectively, which control signals are received by the second secondary transceiver T22 and by the second main transceiver T12, respectively, for being processed by the second core C22 of the secondary control unit CU2 and by the second core C12 of the main control unit CU1.

If the first main transceiver T11 and/or the first secondary transceiver T21 do not receive the control signals on the first radio channel, the main control unit CU1 of the main apparatus 1 and/or the secondary control unit CU2 of the secondary apparatuses 2, 3 send on the second radio channel a degraded mode signal DMS from the second main transceiver T12 and/or from the second secondary transceiver T22 to the secondary apparatuses 2, 3 and/or to the main apparatus 1, respectively, so that the control units CU1, CU2 of the main apparatus 1 and of the secondary apparatuses 2, 3 switch from the normal mode NM to a second degraded mode DM2, in which the control signals are transmitted on the second radio channel by the second main transceiver T12 of the main apparatus 1 and/or by the second secondary transceiver T22 of the secondary apparatuses 2, 3. If also the second main transceiver T12 and the second secondary transceiver T22 do not receive the control signals on the second radio channel, the control units CU1, CU2 of the main apparatus 1 and of the second apparatuses 2, 3 switch from the second degraded mode DM2 to the system fault mode SFM.

If instead the first main transceiver T11 and the first secondary transceiver T21 receive the control signals on the first radio channel, but the second main transceiver T12 and/or the second secondary transceiver T22 do not receive the control signals on the second radio channel, the main control unit CU1 of the main apparatus 1 and/or the secondary control unit CU2 of the secondary apparatuses 2, 3 send on the first radio channel a degraded mode signal DMS from the first main transceiver T11 and/or from the first secondary transceiver T21 to the secondary apparatuses 2, 3 and/or to the main apparatus 1, respectively, so that the control units CU1, CU2 of the main apparatus 1 and of the secondary apparatuses 2, 3 switch from the normal mode NM to a third degraded mode DM3, in which the control signals are transmitted on the first radio channel by the first main transceiver T11 of the main apparatus 1 and/or by the first secondary transceiver T21 of the secondary apparatuses 2, 3, while no control signals are transmitted on the second radio channel. If also the first main transceiver T11 and the first secondary transceiver T21 do not receive the control signals on the first radio channel, the control units CU1, CU2 of the main apparatus 1 and of the second apparatuses 2, 3 will switch from the third degraded mode DM3 to the system fault mode SFM.

Possible modifications and/or additions may be made by those skilled in the art to the hereinabove disclosed and illustrated embodiment while remaining within the scope of the following claims. In particular, further embodiments of the invention may comprise the technical features of one of the following claims with the addition of one or more technical features, taken singularly or in any mutual combination, disclosed in the text and/or illustrated in the drawings.

The invention claimed is:

1. A secondary apparatus for personal protection, which comprises a secondary control unit which is connected to at least one firing controller and to at least one first secondary transceiver for transmitting and receiving on a first radio channel control signals and/or activation signals, wherein the secondary control unit is connected to a smart-card reader for reading an identification code stored in a smart-card and transmitting this identification code from the secondary transceiver in a control signal.

2. The secondary apparatus according to claim 1, wherein the secondary control unit is also connected to a second secondary transceiver for transmitting and receiving on a second radio channel control signals and/or activation signals.

3. A protective garment comprising the secondary apparatus according to claim 2, wherein a firing controller is connected to one or more gas generators connected to one or more airbags.

4. A system for personal protection, comprising one or more secondary apparatuses according to claim 2, which the one or more secondary apparatuses are suitable for communicating at least one identification code to a main apparatus for personal protection, which comprises a main control unit which is connected to one or more sensors and to at least one first main transceiver for transmitting and receiving on a first radio channel control signals and/or activation signals received or transmitted, respectively, by at least one secondary apparatus of the one or more secondary apparatuses, wherein in that the main control unit is connected to at least one non-volatile memory containing a reference code suitable for being compared by the main control unit with an identification code received by the at least one main transceiver in a control signal transmitted by said one or more secondary apparatuses.

5. A process suitable for being carried out by the system according to claim 4, comprising the following operating steps:
    inserting a smart-card containing at least one identification code into a smart-card reader connected to a secondary control unit of the one or more secondary apparatuses;
    transmitting the identification code from at least one secondary transceiver of the one or more secondary apparatuses to at least one main transceiver connected to the main control unit of the main apparatus;
    comparing, by the main control unit of the main apparatus, the identification code with a reference code stored in the at least one non-volatile memory.

6. The secondary apparatus according to claim 1, wherein the secondary control unit is connected to a vibrating device.

7. A protective garment comprising the secondary apparatus according to claim 6, wherein the firing controller is further connected to one or more gas generators connected to one or more airbags.

8. A system for personal protection, comprising one or more secondary apparatuses according to claim 6, which the one or more secondary apparatuses are suitable for communicating at least one identification code to a main apparatus for personal protection, which comprises a main control unit which is connected to one or more sensors and to at least one first main transceiver for transmitting and receiving on a first radio channel control signals and/or activation signals received or transmitted, respectively, by at least one secondary apparatus of the one or more secondary apparatuses, wherein the main control unit is connected to at least one non-volatile memory containing a reference code suitable for being compared by the main control unit with an identification code received by the main transceiver in a control signal transmitted by said one or more secondary apparatuses.

9. A process suitable for being carried out by the system according to claim 8, comprising the following operating steps:
    inserting a smart-card containing at least one identification code into a smart-card reader connected to the secondary control unit of at the one or more secondary apparatuses;
    transmitting the identification code from at least one secondary transceiver of the one or more secondary apparatuses to at least one main transceiver connected to the main control unit of the main apparatus;
    comparing, by the main control unit of the main apparatus, the identification code with a reference code stored in the at least one non-volatile memory.

10. A protective garment, comprises the secondary apparatus according to claim 1, wherein the firing controller is connected to one or more gas generators connected to one or more airbags.

11. A system for personal protection, comprises one or more secondary apparatuses according to claim 1, which the one or more secondary apparatuses are suitable for communicating at least one identification code to a main apparatus for personal protection, which comprises a main control unit which is connected to one or more sensors and to at least one first main transceiver for transmitting and receiving on a first radio channel control signals and/or activation signals received or transmitted, respectively, by at least one secondary apparatus, wherein the main control unit is connected to at least one non-volatile memory containing a reference code suitable for being compared by the main control unit with an identification code received by the main transceiver in a control signal transmitted by the secondary apparatus.

12. A process suitable for being carried out by the system according to claim 11, wherein it comprises the following operating steps:
    inserting a smart-card containing at least one identification code is inserted into a smart-card reader connected to a secondary control unit of the one or more secondary apparatuses;
    transmitting the at least one identification code from at least one secondary transceiver of the one or more secondary apparatuses to at least one main transceiver connected to a main control unit of the main apparatus;
    comparing, by the main control unit of the main apparatus, the identification code with a reference code stored in a non-volatile memory.

13. A process according to claim 12, wherein if said comparison is positive, the control unit of the main apparatus periodically transmits and receives control signals with the secondary control unit of the one or more secondary apparatuses through the at least one main and at least one secondary transceivers.

14. The process according to claim 12, wherein the identification code comprises a first sub-code associated with the reference code stored in the main apparatus and a second sub-code which indicates a position of a user of a protective garment in a vehicle.

15. A main apparatus for personal protection, which comprises a main control unit which is connected to one or more sensors and to at least one first main transceiver for transmitting and receiving on a first radio channel control signals and/or activation signals received or transmitted, respectively, by at least one secondary apparatus for personal protection, which comprises a secondary control unit which is connected to at least one firing controller and to at least one first secondary transceiver for transmitting and receiving on a first radio channel control signals and/or activation signals wherein the secondary control unit is connected to a smart-card reader for reading an identification code stored in a smart-card and transmitting this identification code from the secondary transceiver in a control signal, wherein the main control unit is connected to at least one non-volatile memory containing a reference code suitable for being compared by the main control unit with an identification code received by the at least one first main transceiver in a control signal transmitted by said secondary apparatus.

16. The main apparatus according to claim 15, wherein the main control unit is also connected to a second main transceiver for transmitting and receiving on a second radio channel control signals and/or activation signals.

17. A vehicle comprising the main apparatus according to claim 16.

18. A motorcycle comprising a form of a front wheel and a saddle, wherein it comprises the main apparatus according to claim 16, wherein main sensors are mounted on the fork on two sides of the front wheel and secondary sensors are mounted under the saddle.

19. A vehicle, comprising the main apparatus according to claim 15.

20. A motorcycle comprising a fork of a front wheel and a saddle, wherein it comprises the main apparatus according to claim 15, wherein main sensors are mounted on the fork on two sides of the front wheel and secondary sensors are mounted under the saddle.

* * * * *